J. H. DANCY.
Improvement in Seed Planters.
No. 132,564.  Patented Oct. 29, 1872.
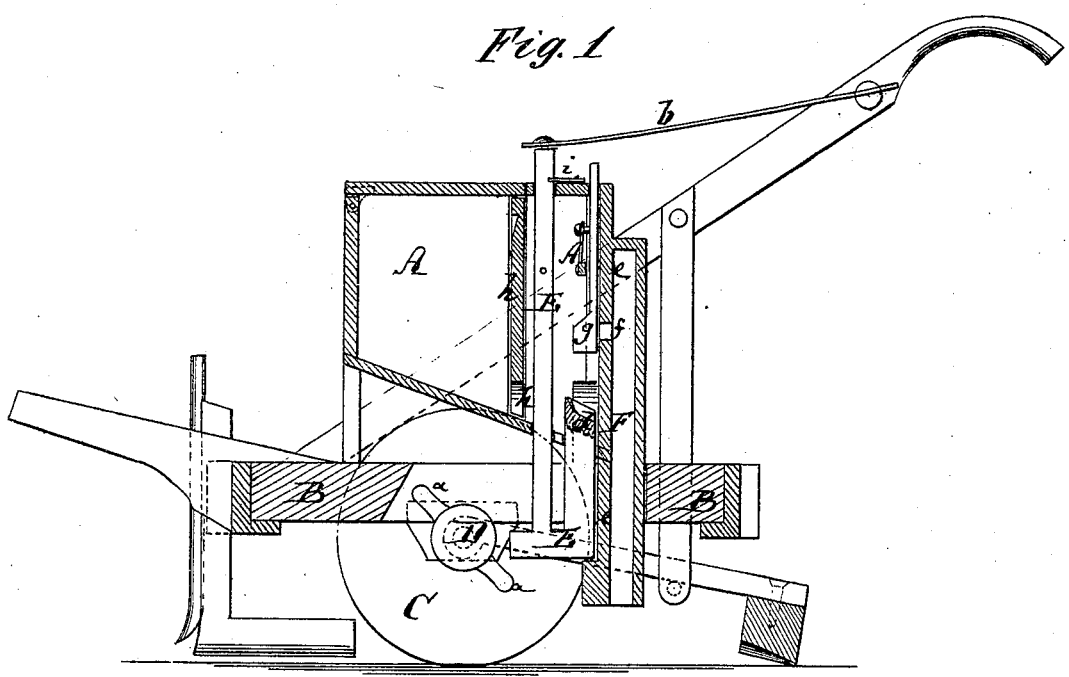
Witnesses:
A. W. Almquist
C. Sedgwick
Inventor:
J. H. Dancy
per Munn & Co.
Attorneys.

UNITED STATES PATENT OFFICE.

JOHN H. DANCY, OF DANCYVILLE, TENNESSEE.

IMPROVEMENT IN SEED-PLANTERS.

Specification forming part of Letters Patent No. 132,564, dated October 29, 1872.

*To all whom it may concern:*

Be it known that I, JOHN H. DANCY, of Dancyville, in the county of Haywood and State of Tennessee, have invented a new and Improved Seed-Planter, of which the following is a specification:

Figure 1 is a vertical longitudinal section of my improved seed-planter, the line $c\ c$, Fig. 2, indicating the plane of section. Fig. 3 is a top view of the same.

Similar letters of reference indicate corresponding parts.

This invention relates to the class of seed-planters in which the amount of seed required for a hill is elevated within the seed-hopper and discharged through a hole in the upper part of the hopper into the drop-tube. The object of the invention is to insure the planting of the requisite amount of seed at proper intervals and without the least injury to the seed. The invention consists in the use and new arrangement, with the vertical slide which elevates the seed to be dropped to the hole in the upper part of the hopper, of a cut-off, and other appurtenances which are necessary in order to make the slide effective.

A in the drawing is the seed-hopper, mounted on a frame, B, which is supported on wheels C C. The axle D of the wheels is made to revolve with them, and has a cam or cams, $a\ a$, which, striking the lower end of a vertical slide, E, causes the same to reciprocate, a spring, $b$, bearing on the upper end of the slide to throw it down after the cam has raised it. The slide E moves close to the back of the hopper, and carries a cup, $d$, in which the seed to be dropped is elevated. The cup $d$ is closed at the back by the vertical back $e$ of the hopper, in which there is a hole, $f$. Whenever the slide E is raised by the cam $a$ the cup $d$ is brought opposite the hole $f$, and allows its contents to flow through said hole into the discharge-tube F. $g$ is a cut-off or spring-slide, by which the hole $f$ is kept closed while the slide E is down in order to prevent the contents of the hopper from escaping through the hole $f$. This cut-off is raised clear of the hole $f$ by the ascending slide. $h$ is a partition put into the hopper close in front of the slide, but notched or perforated at the bottom to regulate the height to which the seed fills the back compartment of the hopper.

When the cup is down, as in Fig. 1, it becomes filled with seed and carries it up, during the ascent, to the hole $f$, discharging it through the same into the tube F, whence the seed is conveyed to the ground. The furrow for receiving the seed is opened and closed by suitable devices attached to the frame of the planter.

When the planter is to be conveyed to or from the field, the slide E is held elevated clear of the cam $a$ by means of a bolt or catch, $i$, which is arranged on top of the hopper.

Having thus described my invention, I claim as new and desire to secure by Letters Patent—

The combination of the cut-off $g$ and partition $h$ with the seed-hopper A, slide E, and cam $a$, substantially as herein shown and described.

JOHN H. DANCY.

Witnesses:
JAMES THOMAS,
I. N. STANLY.